United States Patent
Sesselmann et al.

(12)

(10) Patent No.: US 7,288,867 B2
(45) Date of Patent: Oct. 30, 2007

(54) DRIVE FOR AN ADJUSTER DEVICE IN A MOTOR VEHICLE

(75) Inventors: Helmut Sesselmann, Steinach (DE);
Markus Schultz, Nuremberg (DE)

(73) Assignee: Brose Fahrzeugteile GmbH & Co, Coburg, Coburg (DE)

( * ) Notice: Subject to any disclaimer, the term of this patent is extended or adjusted under 35 U.S.C. 154(b) by 342 days.

(21) Appl. No.: 10/517,247

(22) PCT Filed: May 30, 2003

(86) PCT No.: PCT/DE03/01823

§ 371 (c)(1),
(2), (4) Date: Apr. 25, 2005

(87) PCT Pub. No.: WO03/105315

PCT Pub. Date: Dec. 18, 2003

(65) Prior Publication Data

US 2005/0174002 A1    Aug. 11, 2005

(30) Foreign Application Priority Data

Jun. 7, 2002   (DE)   ................................. 102 26 341

(51) Int. Cl.
*H02K 7/102* (2006.01)
(52) U.S. Cl. .......................................... 310/93; 310/77
(58) Field of Classification Search ................. 310/77, 310/92, 93, 261, 75 R, 268; 188/164, 162
See application file for complete search history.

(56) References Cited

U.S. PATENT DOCUMENTS

| | | | | | |
|---|---|---|---|---|---|
| 2,959,695 | A | * | 11/1960 | Huff | 310/77 |
| 4,560,895 | A | * | 12/1985 | Zahner | 310/77 |
| 4,823,035 | A | * | 4/1989 | Kudla et al. | 310/68 C |
| 5,018,603 | A |   | 5/1991 | Ito | 187/17 |
| 5,982,063 | A | * | 11/1999 | Lutz et al. | 310/77 |
| 2005/0174002 | A1 | * | 8/2005 | Sesselmann et al. | 310/93 |

FOREIGN PATENT DOCUMENTS

| | | |
|---|---|---|
| DE | 70 47 986 | 6/1971 |
| DE | 70 47 986 U | 6/1971 |

(Continued)

OTHER PUBLICATIONS

International Search Report of PCT/DE2003/01823, dated Oct. 31, 2003.

(Continued)

*Primary Examiner*—Karl Tamai
(74) *Attorney, Agent, or Firm*—Christie, Parker & Hale, LLP

(57) ABSTRACT

A drive for an adjuster device in a motor vehicle. The drive includes a drive motor, a drive element mounted to rotate about a drive axis, and a self-locking device for the drive element, which, when the drive motor is not energized, locks the drive element with the locking element. The locking element may be brought out of engagement with the drive element in the radial direction relative to the drive axis on energizing the drive motor.

24 Claims, 3 Drawing Sheets

FOREIGN PATENT DOCUMENTS

| | | | |
|---|---|---|---|
| DE | 43 02 143 A1 | | 7/1994 |
| DE | 199 42 362 C1 | | 1/2001 |
| DE | 199 43 692 A1 | | 3/2001 |
| FR | 2 405 586 | | 5/1979 |
| JP | 60-028747 | * | 2/1985 |
| JP | 60028747 A | | 2/1985 |
| JP | 01-174234 | * | 7/1989 |
| WO | WO94/23220 | | 10/1994 |

OTHER PUBLICATIONS

International Preliminary Examination Report of PCT/DE2003/01823, dated Jul. 26, 2004.

Patent Abstract of Japan, Publication No. 60028747 A, Published Feb. 13, 1985, in the name of Tanigawa, et al.

English Translation of the International Preliminary Examination Report for International Application No. PCT/DE2003/001823, International Filing Date of May 30, 2003 in the name of Brose Fahrzeugteile GmbH & Co. KG, Coburg et al.

* cited by examiner

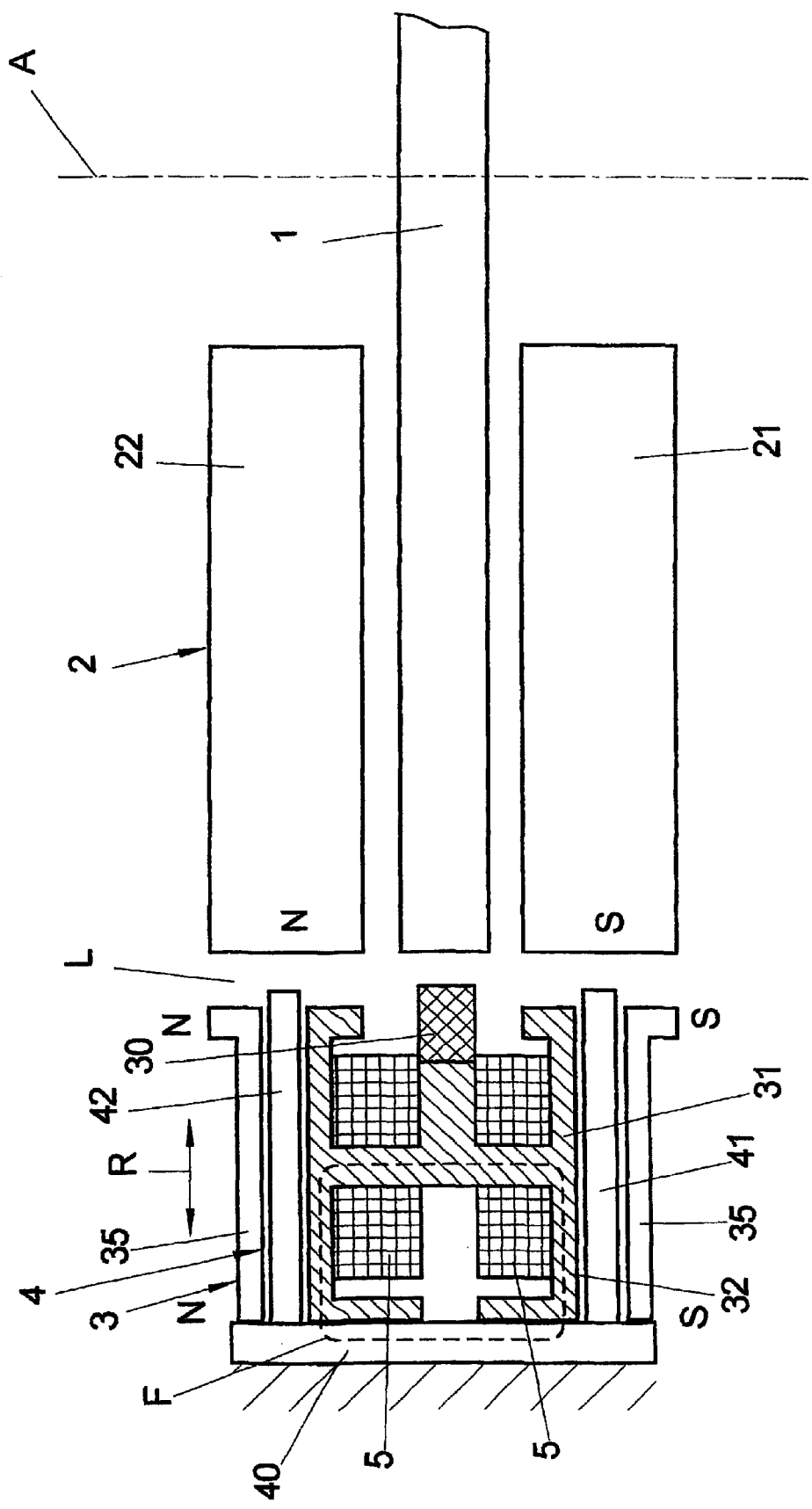

DRIVE FOR AN ADJUSTER DEVICE IN A MOTOR VEHICLE

CROSS-REFERENCE TO RELATED APPLICATION

This application is a National Phase Patent Application of International Application Number PCT/DE2003/01823, filed on May 30, 2003, which claims priority of German Patent Application Number 102 26 341.8, filed on Jun. 7, 2002.

BACKGROUND

The invention relates to a drive for an adjuster device in a motor vehicle.

A drive of this kind comprises a drive motor, a drive element mounted rotatable about a drive axis, e.g. in the form of a rotor of the drive motor; as well as a device for the self-locking of the drive element which in the de-energized state of the drive motor locks the drive element with a locking element.

From DE 199 42 362 C1 a self-locking electric drive is known having an electric motor and a transmission on the output side with a transmission housing, a gear output shaft rotatable relative to the transmission housing, and a drive for the self-locking of the gear output shaft. The self-locking electric drive has a locking element which at the same time as the electric motor is operated is displaceable electrically from a first position to a second position, as well as an element which is fixed relative to the transmission housing wherein the locking element in the first position produces a positive coupling between the gear output shaft and the fixed element and wherein this coupling is disengaged in the second position. The fixed element is thereby formed by a gear axis on which the locking element is displaceably mounted in the axial direction. With this arrangement, a self-locking electric drive can be produced in which a sufficiently strong self-locking action is ensured. Thus, with the electric motor switched off, torque applied on the output side is prevented from being transferred to the drive side, without the efficiency of the drive hereby being adversely affected too much. However, this arrangement has the drawback in that the ability of the locking element to move in the axial direction to produce and clear the self-locking action requires a certain extension in the axial direction. This is undesirable, particularly in the case of flat motors of electric driver for motor vehicles, where due to space limitations, obtaining the smallest possible extension of a motor in the axial direction is of great importance.

From WO 94 23220 A a drive is known consisting of a drive motor, a drive element mounted rotatable about a drive axis and a device for the self-locking of the drive element. In the de-energized state of the drive motor the drive element is locked with a locking element. The locking element can be brought out of engagement with the drive element in the radial direction relative to the drive axis for operating the drive motor.

In DE 199 43 692 A1 a disc rotor motor is described, more particularly for adjuster devices in motor vehicles. No device is given for the self locking of the drive element.

From FR 2 405 586 A a rotating electro-mechanical drive is known in which in the de-energized state of the drive motor a locking element is fixed through magnetic forces of a permanent magnet.

SUMMARY

An object of the invention is therefore to provide the simplest possible self-locking design of a motorized drive for an adjuster device.

The locking element for operating the drive motor can be brought out of engagement with the drive element in the radial direction relative to the drive axis in order to permit movement of the drive element during energizing of the associated drive motor. The locking element is in the de-energized state of the drive motor fixed by magnetic forces which are generated by the stator of the drive motor in a position which locks the drive element.

Bringing the locking element out of engagement can, on the one hand take place when energizing the drive motor, e.g. by using the electric current, which is used to energize the drive motor at the same time to actuate the locking element, possibly by means of an electromagnet. On the other hand, it can also be provided that the locking of the drive element is cleared prior to energizing the motor so that at the start of operating the motor the locking element is in each case out of engagement with the drive element. This type of timed control of lifting the locking element from the drive element can be particularly advantageous if the locking element is in positive engagement with the drive element.

Conversely, the locking element on switching off the drive can be moved radially into engagement again with the drive element so that a rotational movement of the drive element about its drive axis is locked and the transfer of forces applied on the output side to the drive side is prevented (self-locking). This engagement process can be controlled so that there is no sudden engagement but a controlled measured engagement, e.g., to prevent noises.

The solution according to the invention has the advantage that it enables a self locking action which, on the one hand, does not impair the efficiency of the drive and which, on the other hand, requires no special extension of the drive motor in the axial direction.

The solution according to the invention is therefore particularly suitable for use in the case of flat motors which have for example a rotor in the form of a disc rotor wherein the locking element during energizing of the flat motor is lifted in the radial direction from the drive element so that the forces generated by the flat motor lead to a rotational movement of the drive element. When using the solution according to the invention for a flat motor having a disc rotor (disc rotor motor) in which the locking element can be brought in and out of engagement radially with the rotor (armature disc), it enables the large friction radius of the armature disc to guarantee a sufficient self-locking action with comparatively small braking forces. The permanent magnetic energy which is constantly available locks the armature disc when the motor is not energized, that is on applying a force on the output side, e.g. on a window pane which is to be adjusted through the drive or on a seat part which is to be adjusted through the drive. The self-locking action is hereby not generated in the first instance through the gear configuration but is obtained through a permanent magnetic brake which manages without any additional energy source.

In order to bring the locking element out of engagement with the drive element when the drive motor is energized, according to a variation of the invention, an elastic element can be used which is coupled to the drive motor in the suitable way so that during energizing of the drive motor the locking of the drive element can be lifted.

In a particularly preferred variation of the invention the locking element can be brought electrically out of engagement with the drive element.

In one variation of the invention the magnetic forces can be generated for example through a permanent magnet which forms the stator of the drive motor.

Thus, a permanent magnet which is in any case provided as a stator in the motor can hereby be used to generate the brake force with which the drive element is locked when the (de-energized) drive motor is switched off.

The locking element has itself a first magnetizable section whose magnetization fixes the locking element in a position in which it locks the drive element. The said first magnetic section defines a first magnetic path for the magnetic flux which is generated by the magnet used to fix the locking element and with which a magnetic force is produced which fixes the locking element in its position locking the drive element.

In order to bring the locking element out of engagement with the drive element when the drive motor is energized it is possible to use an electromagnet which is for example energized together with the drive motor and which generates a magnetic field through whose flux or force action the locking element is brought out of engagement with the drive element. Through a suitable timed control of the energizing of the electromagnetic or the lifting of the current through the electromagnet it is thereby possible to control the timed connection between the start of operation of the drive motor and the release of the locking element, as well as to obtain a smooth re-engagement of the locking element in the drive element when the drive motor is switched off.

According to one embodiment of the invention the field produced by the electromagnet deflects the magnetic flux serving to fix the locking element when the drive motor is de-energized so that the resulting magnetic flux brings the locking element out of engagement with the drive element. With the deflection of the magnetic field the (permanent magnetic) flux which fixes the locking element when the drive motor is de-energized is, after the motor and electromagnet are energized, no longer guided over the short circuit acting as the friction brake but a side path is offered for the flux in which this causes no fixing of the locking element in a position in which it engages with the drive element. The friction brake is thereby released and the drive element can rotate freely. When the motor is switched off the (permanent magnetic) flux is again guided through the short-circuit acting as the brake and thus re-establishes the self-locking action.

According to another embodiment of the invention the (permanent magnetic) flux fixing the locking element when the drive motor is de-energized is displaced through the magnetic field which is produced by means of an electromagnet when the motor is energized so that the resulting magnetic flux brings the locking element out of engagement with the drive element. During the displacement of the magnetic field the (permanent magnetic) flux is thus displaced by a counter excitation which is produced by energizing an electromagnet. Energizing the electromagnet takes place at the same time as the motor is switched on and leads to a displacement of the (permanent magnetic) flux into a side path provided for this. When the motor is switched off again the counter-excitation is automatically deactivated and the locking element is fixed again by the magnetic flux in a position in which it locks the drive element.

According to a further variation of the invention a permanent magnet through which the locking element can be fixed in a position locking the drive element, as well as an electromagnet or the magnetic fields produced by these two magnets, are integrated into one hybrid magnetic circuit so that the permanent magnetic flux superimposes the electromagnetic flux and the locking element can hereby occupy two stable positions (end positions) of which one engenders the locking of the drive element and the other enables a rotational movement of the drive element. In both stable positions (end positions) the electromagnet can hereby be de-energized each time whereby the transition from one stable position to the other is triggered through a temporary energizing of the electromagnet with a current impulse. As a result with the embodiment of the invention described above a permanent magnet which is provided in any case in the drive and serves to produce the stator field can be directed into a hybrid magnetic circuit so that its flux is superimposed on the electromagnetic flux produced by an electromagnet and the release and closing of the brake is brought about each time through a short current impulse when switching the motor on and off whereby the two end positions of the locking element corresponding with the associated stable positions of the brake are each time occupied de-energized.

A magnetic brake unit of this kind is owing to the permanent magnetic pre-magnetization characterized through small electrical and mechanical time constants, that is the current and the brake force rise up rapidly. The brake force can be introduced in a controlled measured manner by suitably adjusting the current which is used to energize the electromagnet. In particular the brake unit can be intelligently controlled through the motor electronics, e.g., if a vertically movable window starts to become jammed the motor brakes faster than when the window pane moves orderly into an end position. The hybrids to be used for producing a hybrid magnetic circuit furthermore have the advantage that they are small and light.

In a further development of the invention the locking element has a brake element which in order to lock the drive element acts on same, namely preferably as a (elastically designed) friction element. The locking element or its brake element is for this guided movable in the radial direction on a guide device, namely is more particularly radially displaceable. It is however possible to provide a positive engagement of the locking element in the drive element instead of a force locking or friction locking engagement.

Furthermore in order to intensify the brake force (in the case of a force locking brake action) or to deliberately adjust (e.g. lengthen) the path required for the locking element to move in and out (particularly in the case of a positive locking brake action) the locking element can be actuated through a lever mechanism.

BRIEF DESCRIPTION OF THE DRAWINGS

Further features and advantages of the invention will now be apparent from the following description of an embodiment with reference to the drawings.

FIG. 3 is a drive motor according to FIG. 1 during operation of the motor.

DETAILED DESCRIPTION

Figure 1:
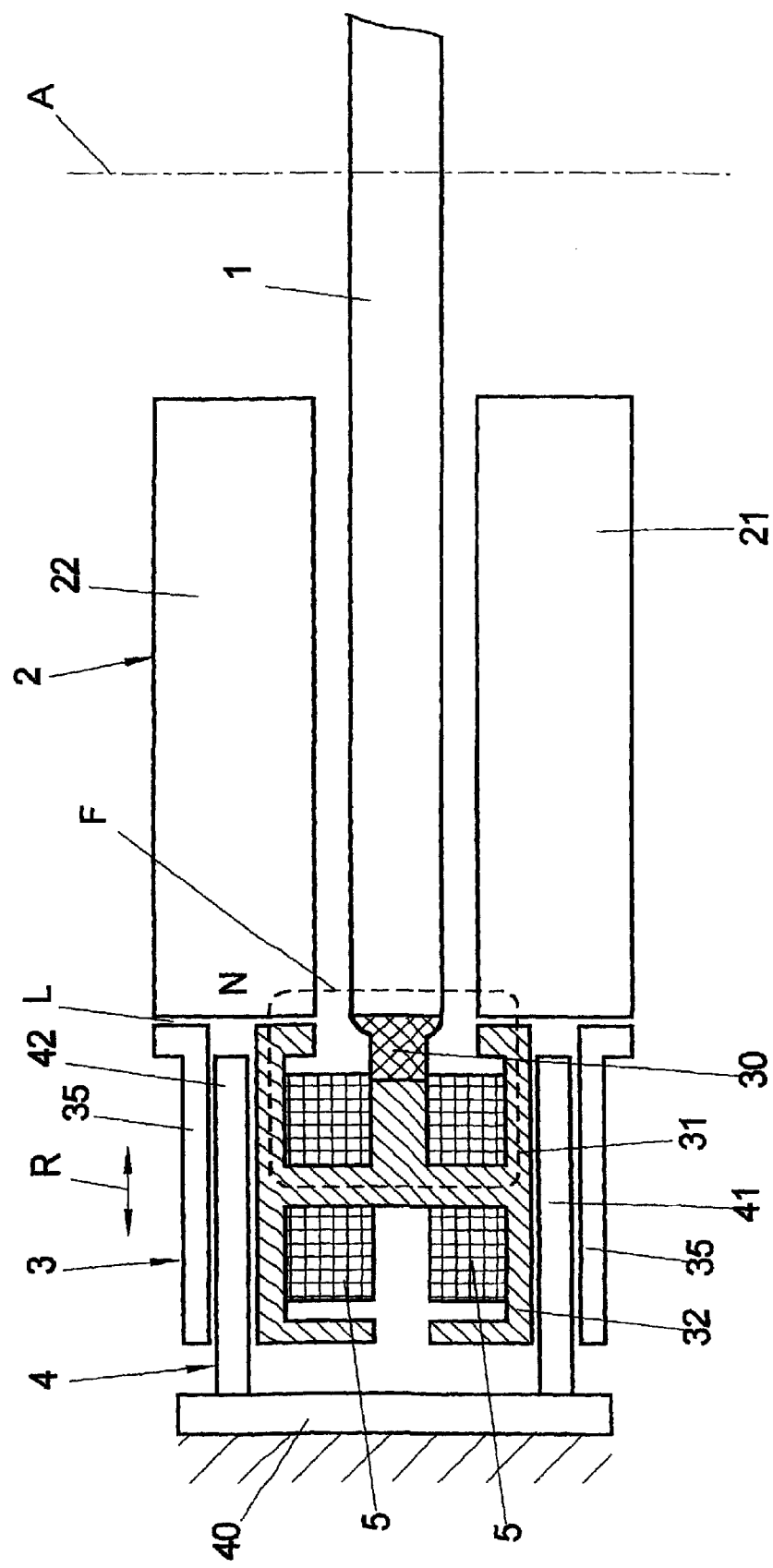
FIG. 1 is a diagrammatic view of a drive motor for an adjuster device in a motor vehicle, with a device for locking the rotor in the de-energized state.

FIG. 1 shows of a drive motor designed as a flat motor for an adjuster device in motor vehicles, e.g. for adjusting a window pane, (electric window lifter) or for adjusting a seat part (electric seat adjuster) a disc rotor 1 (armature disc) as well as a stator 2 which is formed by permanent magnets 21, 22. The disc rotor 1 is mounted to rotate about an axis A on a shaft (not shown in FIG. 1).

The drive motor illustrated in FIG. 1 is a result of the design of the rotor 1 characterized as a disc rotor or armature disc in particular through its small extension along the drive axis A of the disc rotor 1. This plays a significant part in adjuster devices in motor vehicles, e.g., in the form of an electric window lifter or electric seat adjuster since often there is only a little space available for the drive motor.

When the drive is switched off, i.e. de-energized in order to prevent a force applied on the output side, e.g., on a window pane to be adjusted or on a seat part to be adjusted from being transferred to the drive side, the drive motor is allocated a brake device 3, 4, 5 which comprises a locking element 3, a guide device 4 for guiding the locking element 3 in the radial direction R relative to the drive axis A and an electromagnet 5 for actuating the locking element 3.

The locking element 3 comprises an elastically deformable brake element 30 in the form of a friction brake which can be brought into engagement with the outer edges of the disc rotor 1 and thereby locks the disc rotor 1 so that it cannot rotate about the drive axis A. The brake element 30 is connected to a body of magnetic material which comprises a first magnetizable section with a current path 31 as well as a second magnetizable section with a current path 32 which can each form a path for the magnetic flux which is generated by the stator 2 or electromagnet 5. Furthermore the locking element 3 comprises guide regions 35 which are guided together with the two current paths 31, 32 displaceable in a radial direction R on a guide element 4 consisting of two elongated guide parts 41, 42. A magnetic plate 40 is mounted on the guide device 4 on the side remote from the disc rotor 1 and stator 2.

The electromagnet 5 is connected to the locking element 3 so that it can be displaced together with same in the radial direction R relative to the drive axis A.

FIG. 1 shows the electric drive motor 1, 2 when it is switched off, i.e. in the de-energized state. In this case the electromagnet 5 is also de-energized. The magnetic flux F is therefore solely generated by the permanent magnets 21, 22 of the stator 2. The magnetic flux F extends through the shortest available path, namely the first path 31 of the locking element 3. A magnetic force is hereby generated which moves the brake element 30 in the direction of the drive motor 1, 2 so that the elastically deformable brake element 30 presses against the outer edge of the disc rotor 1 and locks it through friction action. The disc rotor 1 can therefore not turn about its drive axis A and the transfer of torque applied on the output side to the drive side is ruled out. This corresponds to a self locking action of the drive motor 1, 2 in the de-energized state. The operating air gap L between the outer edge of the drive motor 1, 2 and the locking element 3 is hereby minimized.

Figure 2:
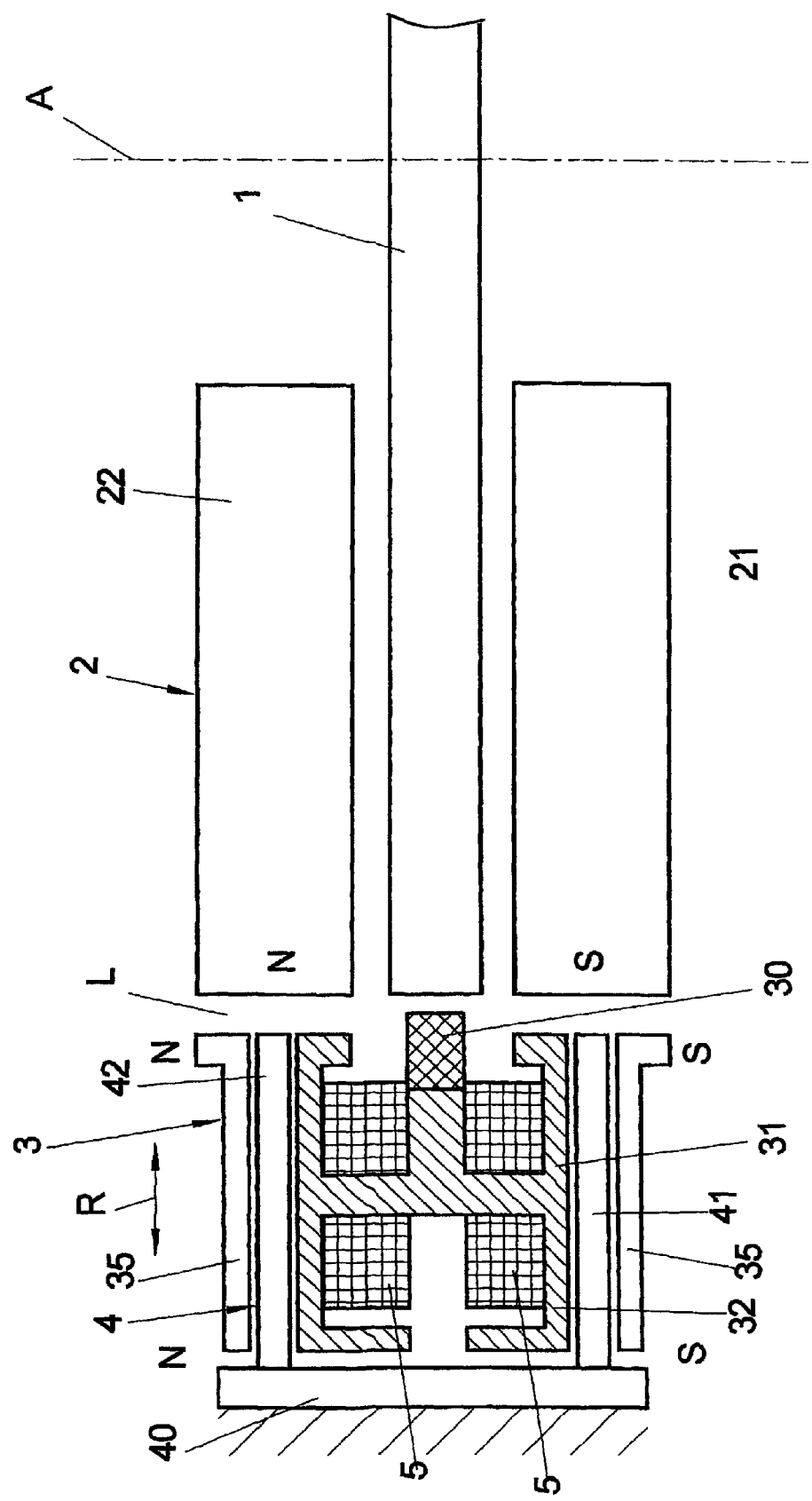
FIG. 2 is a drive motor according to FIG. 1 at the start of energizing the motor.

FIG. 2 shows the drive motor 1, 2 of FIG. 1 when the drive motor is switched on, i.e., at the start of energizing of the drive motor 1, 2 whereby at the same time the electromagnet 5 is energized. The current direction of the current flowing through the electromagnet 5 is thereby selected so that the magnetic flux generated by the electromagnet 5 runs oppositely to the magnetic flux generated by the permanent magnet 21, 22 and thus displaces same (magnetic field displacement). In the region of the operating air gap L between the outer edge of the drive motor 1, 2 and the locking element 3, the permanent magnet 21, 22 on the one side and the first magnetic section 31 of the locking element 3 facing the outer edge of the drive motor 1, 2 on the other are oppositely magnetized so that the brake element 3 is repelled in the radial direction R and the operating air gap L is enlarged. The brake which ensures the self-locking action in the de-energized state of the drive motor 1, 2 is thereby released.

In the situation shown in FIG. 3 the brake is completely opened. The resulting magnetic flux F generated by the permanent magnet 21, 22 and the electromagnet 5 now extends through a side path which is formed by the second magnetic section 32 of the locking element 3 and by the plate-shaped section 40 of the guide device 4. The locking element 3 is hereby fixed in a radial position in which the brake element 30 is located out of engagement with the disc rotor 1 so that this can rotate freely about the drive axis A and a torque applied on the drive side can be transferred to the output side.

Very similar conditions to those described above regarding the magnetic field displacement exist with the so-called magnetic field deflection. Here, a switch (magnetic switch) is electrically actuated and the magnetic field is hereby deflected through a second flux path.

Furthermore, the arrangement according to FIGS. 1 to 3 also meets the requirements for a construction with hybrid magnets with two stable end positions which can be occupied in the de-energized state. The activation and deactivation of the brake takes place for example through a short current impulse according to the flip-flop principle.

The brake device 3, 4, 5 illustrated in FIGS. 1 to 3 for a disc rotor motor 1, 2 has the advantage that it causes in the de-energized state a reliable self-locking of the drive without influencing the efficiency in the operation of the motor and also does not influence the extension of the flat motor 1, 2 in the axial direction, thus along the drive axis A.

The invention claimed is:

1. Drive for an adjuster device in a motor vehicle, comprising:
   a drive motor with a stator;
   a drive element mounted rotatable about a drive axis; and
   a device for self-locking of the drive element which in a de-energized state of the drive motor locks the drive element with a locking element,
wherein the locking element for operating the drive motor is brought out of engagement with the drive element in a radial direction relative to a drive axis and wherein the locking element in the de-energized state of the drive motor is fixed by magnetic forces which are generated through the stator of the drive motor in a position which locks the drive element.

2. The drive according to claim 1 wherein the locking element is lifted in the radial direction from the drive element.

3. The drive according to claim 1 or 2 wherein the drive element is formed by a rotor of the drive motor.

4. The drive according to claim 3 wherein the drive element is a disc rotor.

5. The drive according to claim 1 wherein the locking element is brought out of engagement with the drive element by an elastic element.

6. The drive according to claim 1 wherein the locking element is electrically brought out of engagement with the drive element.

7. The drive according to claim 1 wherein the magnetic forces are generated by a permanent magnet.

8. The drive according to claim 1 wherein the locking element has a first magnetic section.

9. The drive according to claim 8 wherein through magnetizing the first magnetic section the locking element is fixed in a position which locks the drive element.

10. The drive according to claim 9 wherein the first magnetic section defines a first magnetic path for magnetic flux.

11. The drive according to claim 8 wherein in the first magnetic section runs a magnetic flux through which the locking element is fixed in a position locking the drive element.

12. The drive according to claim 1 wherein the locking element is brought out of engagement with the drive element by energizing an electromagnet.

13. The drive according to claim 12 wherein the electromagnet is energized at the same time as the drive motor.

14. The drive according to claim 11 wherein the electromagnet generates a magnetic field through which the locking element is brought out of engagement with the drive element.

15. The drive according to claim 11 wherein the magnetic field generated through the electromagnet diverts the magnetic flux so that the resulting magnetic flux brings the locking element out of engagement with the drive element.

16. The drive according to claim 11 wherein the magnetic field generated by the electromagnet displaces the magnetic flux so that the resulting magnetic flux brings the locking element out of engagement with the drive element.

17. The drive according to claim 14 wherein the resulting magnetic flux runs in a side path of a second magnetic section of the locking element.

18. The drive according to claim 7, further including an electromagnet wherein the permanent magnet and the electromagnet are integrated in a hybrid magnetic circuit so that a permanent magnetic flux superimposes an electromagnetic flux and the locking element thereby occupy two stable positions wherein in one stable position the drive element is locked by the locking element and in the other stable position the locking element is out of engagement with the drive element.

19. The drive according to claim 18 wherein the electromagnet is each time de-energized in both stable positions of the locking element.

20. The drive according to claim 18 wherein the transition from one stable position into the other stable position is triggered by energizing the electromagnet with a current impulse.

21. The drive according to claim 1 wherein the locking element has a brake element which in order to lock the drive element acts on the drive element.

22. The drive according to claim 21 wherein the brake element acts with friction on the drive element.

23. The drive according to claim 1 wherein the locking element is movably guided in the radial direction on a guide device.

24. The drive according to claim 1 wherein the locking element is displaceable in the radial direction.

* * * * *

UNITED STATES PATENT AND TRADEMARK OFFICE
CERTIFICATE OF CORRECTION

PATENT NO. : 7,288,867 B2  Page 1 of 1
APPLICATION NO. : 10/517247
DATED : October 30, 2007
INVENTOR(S) : Helmut Sesselmann et al.

It is certified that error appears in the above-identified patent and that said Letters Patent is hereby corrected as shown below:

In the Claims

Column 8, line 8, Claim 18    Delete "occupy",
                              Insert --occupies--

Signed and Sealed this

Seventeenth Day of June, 2008

JON W. DUDAS
*Director of the United States Patent and Trademark Office*